United States Patent
Matsuzaki

(10) Patent No.: US 6,475,006 B2
(45) Date of Patent: Nov. 5, 2002

(54) ROTARY CONNECTOR HAVING MECHANISM FOR LOCKING PAIR OF HOUSINGS IN RELATIVELY ROTATIONAL RELATION

(75) Inventor: Nobuo Matsuzaki, Miyagi-ken (JP)

(73) Assignee: Alps Electric., Ltd., Tokyo (JP)

( * ) Notice: Subject to any disclaimer, the term of this patent is extended or adjusted under 35 U.S.C. 154(b) by 0 days.

(21) Appl. No.: 09/862,553

(22) Filed: May 22, 2001

(65) Prior Publication Data

US 2001/0055898 A1 Dec. 27, 2001

(30) Foreign Application Priority Data

May 30, 2000 (JP) .......................... 2000-164789

(51) Int. Cl.⁷ ............................................... H01R 35/04
(52) U.S. Cl. ........................................................ 439/164
(58) Field of Search .................................... 439/164, 15

(56) References Cited

U.S. PATENT DOCUMENTS 5,429,517 A    7/1995  Bolen
5,662,486 A *  9/1997  Kato et al. ................... 439/164
5,871,366 A    2/1999  Nishikigi et al.

* cited by examiner

Primary Examiner—Gary F. Paumen
(74) Attorney, Agent, or Firm—Brinks Hofer Gilson & Lione

(57) ABSTRACT

Since a rotary connector B in which lock operation is released is mounted onto a steering device, in this mounting operation, the neutral rotation positions of both housings are shifted, resulting in wrong mounting. Therefore, there is provided a rotary connector permitting reliable mounting. A lock member is integrally formed of an arm portion, a finger-hook portion, a coupling portion, and a fixing portion, the fixing portion having a thin portion and a fixing remaining portion wherein, in a locked state, the fixing remaining portion is held at a locking portion of a first housing, the coupling portion is engaged with a rotation restraint portion, the arm portion is provided along a top surface, and the finger-hook portion is protruded outwardly of an outer cylindrical portion, and in an unlocked state, the finger-hook portion is folded so as to be close to the outer cylindrical portion, thereby separating the arm portion from the thin portion while the fixing remaining portion remains held in the locking portion of the first housing.

6 Claims, 3 Drawing Sheets

ROTARY CONNECTOR HAVING MECHANISM FOR LOCKING PAIR OF HOUSINGS IN RELATIVELY ROTATIONAL RELATION

BACKGROUND OF THE INVENTION

1. Field of the Invention

The present invention relates to a rotary connector which establishes electrical connection using a flexible cable between a pair of housings coupled in a freely rotational relation and, more specifically, to a rotary connector having a lock mechanism for retaining both housings in their neutral rotational position until the rotary connector is mounted on the steering device of a vehicle.

2. Description of the Prior Art

A rotary connector generally comprises a pair of housings coupled in a freely rotational relation, and a flexible cable coiled within an annular container defined between the both housings, with both ends of the flexible cable supported respectively at the both housings to be connected to external electrical connections. As the rotating housing rotates relative to the stationary housing, the flexible cable is coiled tightly or loosely within the container depending on the rotation direction of the rotating housing. In either movement, electrical connection between both housings is maintained via the flexible cable.

The rotary connector thus constructed, is used as electrical connection means for an air bag inflator, a horn switch and the like mounted on a steering wheel, with the stationary housing mounted on a combination switch as a stator member of a steering device of a vehicle while the rotating housing mounted on a steering wheel as a rotor member of the steering device. In this case, the rotary connector is required to rotate in a balanced fashion from the neutral rotational position of the steering wheel with a range of travel in clockwise rotation and a range of travel in counterclockwise rotation being equal. For this reason, a known rotary connector is provided with a lock mechanism which retains both housings in the neutral rotational position by a lock member mounted on the rotary connector until the rotary connector is mounted onto the steering device.

The prior art of such a rotary connector with a lock mechanism is described in Japanese Published Unexamined Patent Application No. Hei 11-97141.

The conventional rotary connector will be explained with reference to the drawings.

FIG. 5 is a perspective view showing a conventional rotary connector and a lock member. FIG. 6 is a cross-sectional view showing a major portion of the lock member of FIG. 5 when it is in a locking engagement.

As shown in FIGS. 5 and 6, a rotary connector B comprises a stationary housing 21, a rotating housing 22, and a flexible cable 23 contained and coiled in both housings 21, 22. A lock member 24 is detachably mounted onto such rotary connector B.

The stationary housing 21 is of a closed-end structure having an outer cylindrical portion 25. A holder wall 26 and a direct connector 27 are integrally formed with the circumference of the outer cylindrical portion 25. The holder wall 26 has a slot 26a as a locking portion.

The rotating housing 22 is coupled to the stationary housing 21 in a freely rotational relation so that the rotating housing 22 closes the aperture of the stationary housing 21. A projection 28a as a rotation restraint portion and a direct connector 29 are integrally formed with a top surface 28 of the rotating housing 22. An inner cylindrical portion 30 extends vertically in the center of the top surface 28.

As shown in FIG. 6, the flexible cable 23 mentioned above is coiled, for example, in a spiral fashion, within an annular container defined by both housings 21,22. Both ends of the flexible cable 23 are respectively supported at both housings 21,22 and then electrically routed outwardly via the direct connectors 27,29, respectively.

The lock member 24 is integrally formed of a horizontally extending arm portion 24a, an annular finger-hook portion 24b continuously extending to one end of the arm portion 24a, a thin portion 24d provided in the other end of the arm portion 24a, and a fixing remaining portion 24c extending downwardly via the thin portion 24d. The arm portion 24a continuously extends to the fixing remaining portion 24c in a direction approximately orthogonal to the fixing remaining portion 24c. A V-shaped notch 31 is formed on the border between both portions and constitutes the thin portion 24d.

The finger-hook portion 24b and the fixing remaining portion 24c are protruded from the arm portion 24a in a direction of approximately 180° apart, respectively.

The arm portion 24a is provided with a coupling hole 32, and a reinforcing rib 24e extends from the top surface of the arm portion 24a to the finger-hook portion 24b. The fixing remaining portion 24c is provided with a bifurcated snap piece 33.

During the manufacturing stage of the rotary connector B, the neutral rotational position of the rotating housing 22 is aligned with the stationary housing 21 and then the fixing remaining portion 24c of the lock member 24 is inserted into the slot 26a of the stationary housing 21, as shown in FIG. 6. The projection 28a of the rotating housing 22 is inserted into the coupling hole 32 of the arm portion 24a. The free rotation of both housings 21,22 is locked by the lock member 24.

At this time, the finger-hook portion 24b of the lock member 24 is disposed on the top surface 28 of the rotating housing 22.

Such a locked state is maintained until the mounting of the rotary connector onto the steering device.

In the lock member 4, before the rotary connector B is mounted on the steering device, the finger-hook portion 24b is drawn using a finger or a jig (in the direction of arrow D of FIG. 6), and then the arm portion 24a and the finger-hook portion 24b are broken at the thin portion 24d away from both housings 21,22. The lock operation of both housings by means of the lock member 4 is released. In this unlocked state, the fixing remaining portion 24c broken at the thin portion 24d away from the lock member 4 remains in the coupling hole of one of the housings, and thus an unintentional removal of the lock member can be checked by the presence of the fixing remaining portion.

The lock member 4 is broken, and in the unlocked state, the rotary connector B is mounted onto the steering device.

In the above-described rotary connector B, the lock operation of both housings 21,22 by the lock member 24 is released before the rotary connector B is mounted onto the steering device. The finger-hook portion 24b of the lock member 24 is disposed on the top surface 28, and thus, when the rotary connector B is mounted onto the steering device, the finger-hook portion 24b will be an obstacle component due to limitations of the mounting space. The lock operation is released before the mounting, so as to remove the finger-hook portion 24b from the top surface 28.

The rotary connector B in which the lock operation is released is mounted onto the steering device. In this mounting, the neutral rotational positions of both housings are sometimes shifted to each other, resulting in wrong mounting in which the neutral rotational positions are not aligned with each other.

SUMMARY OF THE INVENTION

The present invention solves the foregoing conventional problems, and an object of the present invention is to provide a rotary connector which can be reliably mounted onto a steering device when the neutral rotational positions of both housings are maintained.

A rotary connector of the present invention comprises a first housing having at least an inner cylinder, a second housing having an outer cylinder for forming a containing space together with the first housing while being engaged rotatably with the first housing, a top surface provided in at least one of the first and second housings, a flexible cable contained in the containing space for establishing electrical connection between the first and second housings, and a lock member which is detachably mounted onto the first and second housings and which blocks free rotation between the first and second housings when the lock member is mounted on the first and second housings, wherein the first housing has a first locking portion for locking the lock member, the outer cylinder has a second locking portion for locking the lock member, and the lock member has a first coupling portion to be coupled to the first locking portion and a second coupling portion to be coupled to the second locking portion, and a breaking portion capable of breaking the first and second coupling portions, respectively. According to such a construction, the rotary connector can be mounted onto a steering device while the neutral rotational position of the rotary connector is maintained reliably.

In the rotary connector of the present invention, the first housing is formed with the top surface, and the lock member is mounted on the first and second housings, and, when the first and second housings are in a locked state, has an extending portion extended outwardly of the outer cylinder from the first locking portion along the top surface, the breaking portion being broken by a force applied to the extending portion. According to such a construction, the breaking of the breaking portion can be easily done.

In the rotary connector of the present invention, the breaking portion is a thin portion broken when the force applied to the extending portion is a force directed outwardly of the outer cylinder or a force directed to one of up and down directions along the side wall of the outer cylinder. According to such a construction, the thin portion can be easily formed.

The rotary connector of the present invention comprises a first and a second housings coupled in a freely rotational relation, a flexible cable for establishing electrical connection between the first and second housings, a lock member which is detachably mounted on the first and second housings and which blocks free rotation between the first and second housings when the lock member is mounted thereon, wherein the first housing has a ring-like outer cylindrical portion and a locking portion provided in the outer cylindrical portion, the second housing has a top surface closing the outer cylindrical portion of the first housing and a rotation restraint portion provided in the top surface, the lock member integrally comprising an arm portion, a finger-hook portion continuously extending to one end of the arm portion and extending in a direction orthogonal to the arm portion, a coupling portion provided in the other end of the arm portion, and a fixing portion extending between the coupling portion and the finger-hook portion in the same direction as that of the finger-hook portion, the fixing portion having a thin portion and a fixing remaining portion continuously extending to the thin portion, wherein, when the first and second housings are in a locked state to block free rotation therebetween, the fixing remaining portion of the lock member is held at the locking portion of the first housing, the coupling portion is engaged with the rotation restraint portion of the second housing, the arm portion is provided along the top surface of the second housing, and the finger-hook portion is protruded outwardly of the outer cylindrical portion of the first housing, and when the first and second housings are put into an unlocked state to permit free rotation therebetween, the finger-hook portion is folded so as to be close to the outer cylindrical portion, thereby separating the arm portion from the thin portion while the fixing remaining portion remains held in the locking portion of the first housing. According to such a construction, the rotary connector can be mounted in a locked state to block the free rotation between both housings, and thus, the rotary connector can be mounted onto a steering device while the neutral rotational positions of both housings are maintained reliably.

In the rotary connector of the present invention, the thin portion is formed of a V-shaped notch provided in the fixing portion. According to such a construction, the arm portion can be easily broken away from the fixing remaining portion without reducing the mechanical strength of the thin portion.

In the rotary connector of the present invention, the first housing is a stationary body and the second housing is a rotating body. According to such a construction, the fixing remaining portion is held in the stationary housing during unlocked state. During use of the rotary connector, the fixing remaining portion is prevented from easily coming off the locking portion and generation of noise arising from a held fixing remaining portion is avoided.

DESCRIPTION OF THE PREFERRED EMBODIMENTS

Embodiments of the rotary connector of the present invention will be described in detail hereinafter with reference to the drawings.

Figure 1:
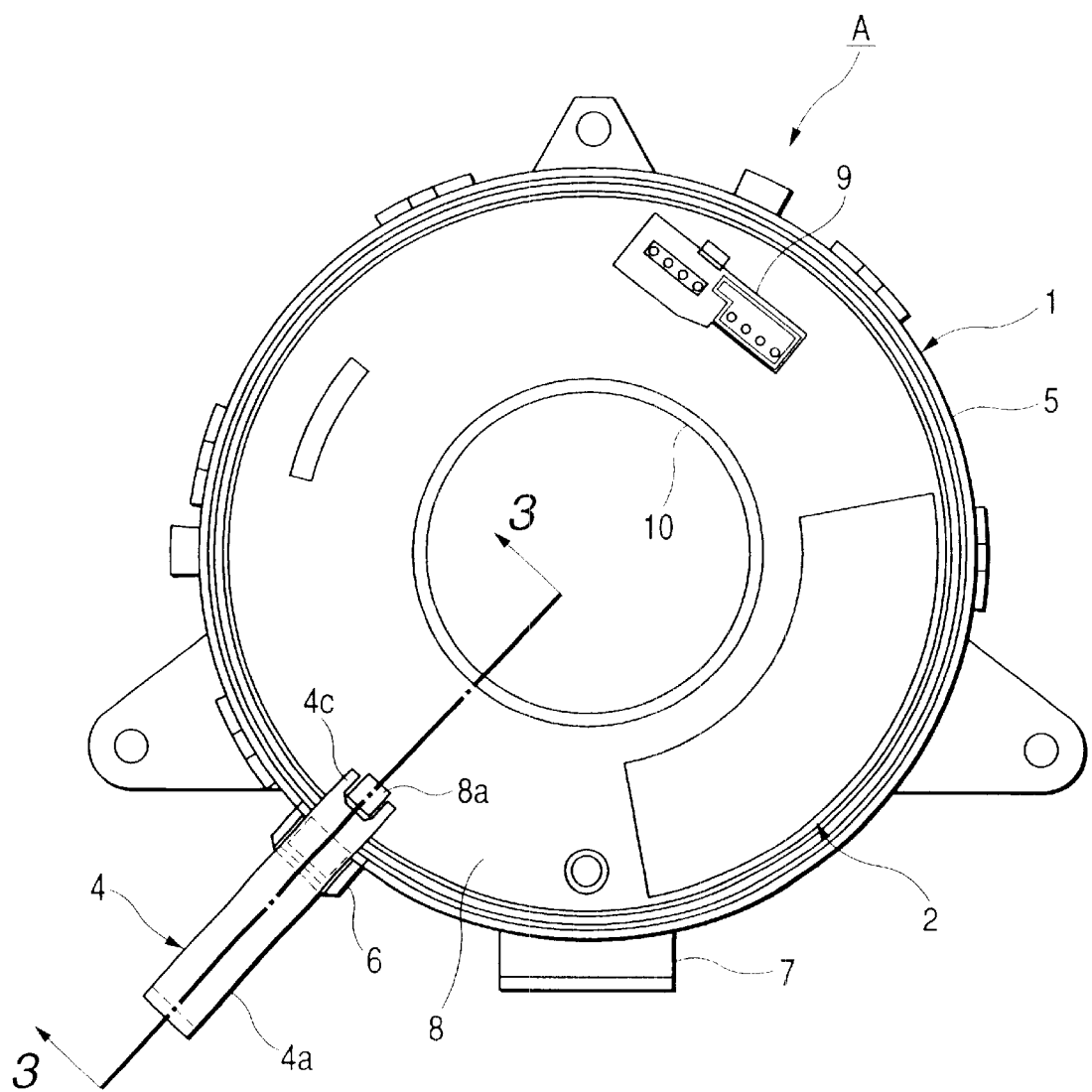
FIG. 1 is a plan view showing a rotary connector and a lock member according to one embodiment of the present invention.
Figure 2:
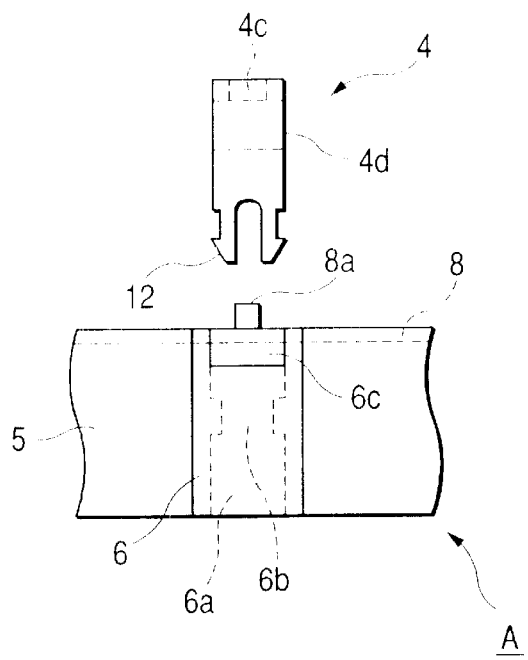
FIG. 2 is an explanatory view showing the mounting operation of the lock member of FIG. 1 onto the rotary connector.
Figure 3:
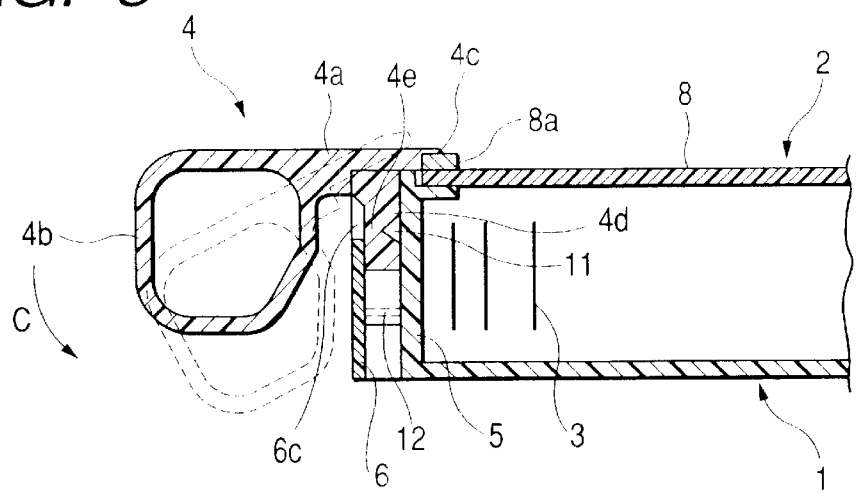
FIG. 3 is a cross-sectional view of a major portion taken on line 3—3 of FIG. 1.
Figure 4:
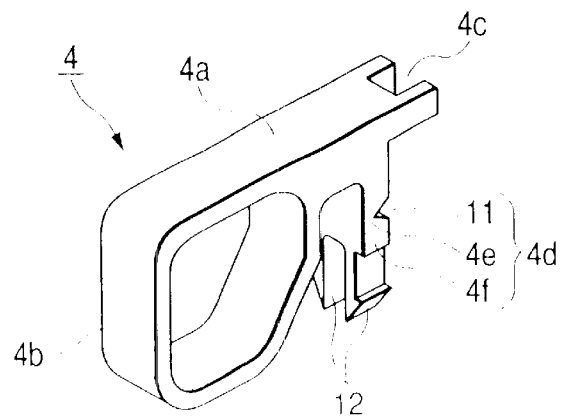
FIG. 4 is a perspective view showing an embodiment of the lock member of the rotary connector of the present invention.
Figure 5:
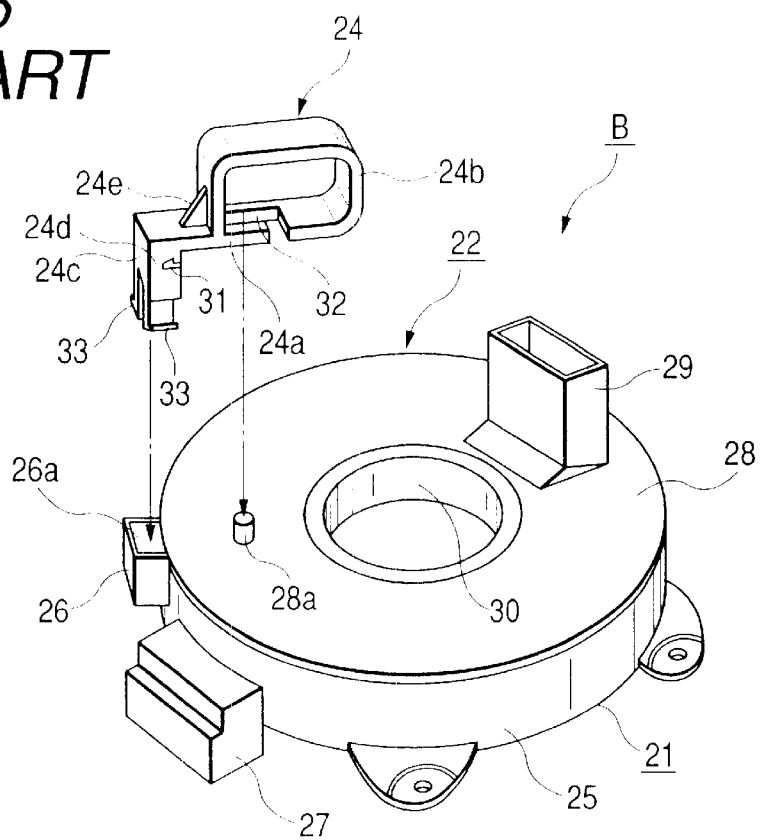
FIG. 5 is a perspective view showing a conventional rotary connector and a conventional lock member.
Figure 6:
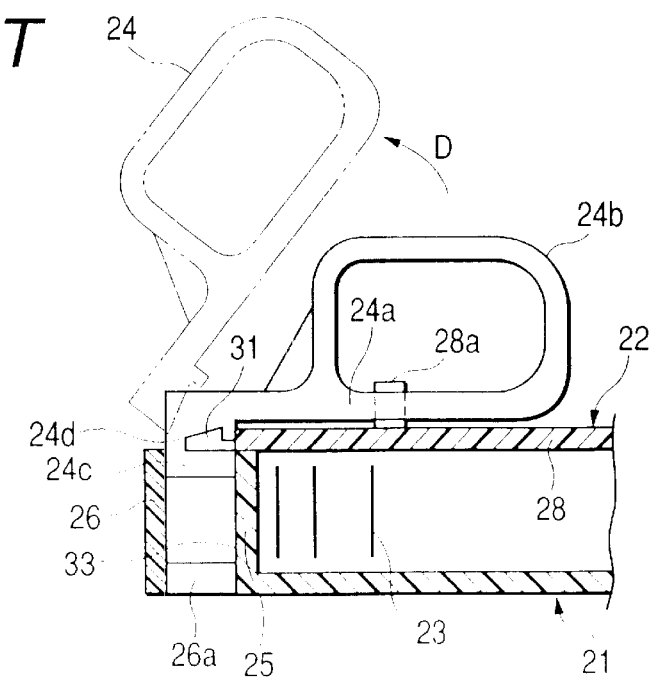
FIG. 6 is a cross-sectional view showing a major portion of the lock member of FIG. 5 when it is in a locking engagement.

FIG. 1 is a plan view showing a rotary connector and a lock member according to one embodiment of the present invention. FIG. 2 is an explanatory view showing the mounting operation of the lock member of FIG. 1 onto the rotary connector. FIG. 3 is a cross-sectional view of a major portion taken on line 3—3 of FIG. 1. FIG. 4 is a perspective view showing an embodiment of the lock member of the rotary connector of the present invention.

As shown in FIGS. 1 and 2, a rotary connector A has a stationary housing 1 as a first housing, a rotating 2 housing as a second housing, and a flexible cable 3 contained and coiled within the housings 1,2 (see FIG. 3). A lock member 4 is detachably mounted onto the rotary connector A.

The stationary housing 1 of a synthetic resin is of a closed-end structure having a ring-like outer cylindrical portion 5. A holder wall 6 of a substantially rectangular tube and a direct connector 7 are integrally formed with the circumference of the outer cylindrical portion 5 as an outer cylinder. As shown in FIG. 2, the holder wall 6 has a slot 6a as a locking portion (a second locking portion), and step portions 6b protruded to the sides of the slot 6a are formed on the inner walls of the holder wall 6. A rectangular notch 6c is formed in the top end of the holder wall 6.

In this embodiment, the holder wall 6 is of a tube with both ends of the slot 6a opened. Alternatively, as long as at least the top end of the slot 6a is opened, the holder wall 6 may be closed at its bottom end, or the holder wall 6 may be of other shape.

The rotating housing 2 is fabricated of a synthetic resin. The rotating housing 2 is coupled to the stationary housing 1 in a freely rotational relation so that the rotating housing 2 closes the aperture of the stationary housing 1. A projection 8a as a rotation restraint portion (a first locking portion) and a direct connector 9 are integrally formed with a top surface 8 of the rotating housing 2 covering the outer cylindrical portion 5 of the stationary housing 1. An inner cylindrical portion 10 as an inner cylinder extends vertically in the center of the top surface 8. As shown in FIG. 3, the above-described flexible cable 3 is coiled, for example, in a spiral fashion, within a ring-shaped container defined in both housings 1,2. Both ends of the flexible cable 3 are respectively supported at both housings 1,2, and then electrically routed outwardly via the direct connectors 7,9, respectively.

As shown in FIG. 4, the lock member 4 is fabricated of a synthetic resin and formed by mold processing. The lock member 4 is integrally formed of a horizontally extending arm portion 4a, a ring-shaped finger-hook portion 4b continuously connected to one end of the arm portion 4a and extending in the direction orthogonal to the arm portion 4a, a U-shaped coupling portion 4c as a first coupling portion provided on the other end of the arm portion 4a, and a fixing portion 4d of a substantially rectangular tube as a second coupling portion extended between the coupling portion 4c and the finger-hook portion 4b in the direction orthogonal to the arm portion 4a. The finger-hook portion 4b and the fixing portion 4d are protruded from the arm portion 4a in the same direction, and the top surface of the arm portion 4a is flat.

A V-shaped notch 11 is formed on the substantially center of the fixing portion 4d. A thin portion 4e as a breaking portion is formed in the bottom of the notch 11. The fixing remaining portion 4f as a second coupling portion is formed on the front side of the fixing portion 4d and from the thin portion 4e to the front side. The fixing remaining portion 4f is provided with a bifurcated snap piece 12.

The rotary connector A thus constructed is used as connection means for an air bag inflator, a horn switch and the like mounted on a steering wheel, with the stationary housing 1 mounted onto the stator member of a steering device and the rotating housing 2 mounted onto the steering wheel as the rotor member of the steering device. When the rotary connector A is assembled, the rotating housing 2 has to rotate both clockwise and counterclockwise from the neutral rotational position of the steering wheel, wherein a range of travel in clockwise rotation is approximately equal to a range of travel in counterclockwise rotation. To this end, during the manufacturing stage of the rotary connector A, the neutral rotational position of the rotating housing 2 is aligned with to the stationary housing 1 and then the fixing portion 4d of the lock member 4 is inserted into the slot 6a of the stationary housing 1, as shown in FIGS. 1 and 2.

The lock member 4 is fully inserted, and the snap piece 12 of the lock member 4 snaps into the step portions 6b of the holder wall 6, as shown in FIG. 3 while the projection 8a of the rotating housing 2 is inserted into the coupling portion 4c of the lock member 4. As a result, the rotation of the rotating housing 2 is blocked by the lock member 4. During the transit of the rotary connector A, the rotating housing 2 is prevented from rotating relative to the stationary housing 1. Such a state is maintained until the rotary connector is mounted onto the steering device.

The finger-hook portion 4b of the lock member 4 is disposed opposite to the holder wall 6 of the stationary housing 1, and the thin portion 4e is disposed opposite to the notch 6c of the holder wall 6. In other words, the finger-hook portion 4b is protruded outwardly of the outer cylindrical portion 5 of the stationary housing 1.

When the rotary connector A is assembled into the steering device, the finger-hook portion 4b of the lock member 4 is hooked, using a finger or a jig, as shown by a chain line in FIG. 3, and is depressed (folded) substantially downwardly (in the direction of arrow C) so as to be close to the outer cylindrical portion 5, and the lock member 4 is removed from the rotary connector A. The fining portion 4d is snapped in the slot 6a of the stationary housing 1. Since the arm portion 4a is formed between the fixing portion 4d and the finger-hook portion 4b, both the finger-hook portion 4b and the arm portion 4a are depressed substantially downwardly as a fulcrum of the thin portion 4e according to the principle of levers and the thin portion 4e that is mechanically weaker than the rest of the lock member 4 can be easily broken. The thin portion 4e is broken through the notch 6c.

As a result, the arm portion 4a is broken at the thin portion 4e away from the fixing remaining portion 4f, and the fixing remaining portion 4f remains snapped in the slot 6a and held in the stationary housing 1. The finger-hook portion 4b, the arm portion 4a and the coupling portion 4c are removed together with the lock member 4. By visually checking the ruptured state of the fixing remaining portion 4f after unlocking the rotary connector, re-mounting of the lock member 4 after the lock member 4 is mounted once can be prevented.

In the embodiment described above, the notch 11 is V-shaped. The notch 11 is not limited to V-shape, for example, may be of rectangular or circular arc.

In the above-mentioned embodiment, the top surface is formed in the rotating housing. The top surface is not limited to this, and may be formed in the stationary housing.

As described above, in the rotary connector of the present invention, a first housing has a first locking portion for locking a lock member, an outer cylinder has a second locking portion for locking the lock member, the lock member has a first coupling portion to be coupled to the first locking portion and a second coupling portion to be coupled to the second locking portion, and has a breaking portion for breaking the first and second coupling portions, respectively. According to such a construction, the rotary connector can be mounted onto a steering device while the neutral rotational position of the rotary connector is maintained reliably.

In the rotary connector of the present invention, when the first and second housings are in a locked state, the lock member has an extending portion extended outwardly of the outer cylinder from the first locking portion along the top surface, the breaking portion being broken by a force applied to the extending portion. According to such a construction, the breaking of the breaking portion can be easily done.

In the rotary connector of the present invention, the breaking portion is a thin portion broken when the force applied to the extending portion is a force directed outwardly of the outer cylinder or a force directed to any one of up and down directions along the side wall of the outer cylinder. According to such a construction, the thin portion can be easily formed.

As described above, in the rotary connector of the present invention, the lock member integrally comprises an arm portion, a finger-hook portion, a coupling portion, and a fixing portion extending between the coupling portion and the finger-hook portion in the same direction as that of the finger-hook portion, the fixing portion having a thin portion and a fixing remaining portion continuously extending to the thin portion, wherein, in a locked state, the fixing remaining portion of the lock member is held at the locking portion, the coupling portion is engaged with the rotation restraint portion, the arm portion is provided along the top surface, and the finger-hook portion is protruded outwardly of the outer cylindrical portion, and in an unlocked state, the finger-hook portion is folded so as to be close to the outer cylindrical portion, thereby separating the arm portion from the thin portion while the fixing remaining portion remains held in the locking portion of the first housing. When the rotary connector is mounted onto a steering device, the finger-hook portion will not obstruct the mounting. The rotary connector can be mounted onto the steering device in a locked state to block the free rotation between both housings, and thus, the rotary connector can be mounted onto the steering device while the neutral rotational positions of both housings are maintained reliably.

In the rotary connector of the present invention, the thin portion is formed of a V-shaped notch provided in the fixing portion. The arm portion can be easily broken away from the fixing remaining portion without reducing the mechanical strength of the thin portion.

In the rotary connector of the present invention, the first housing is used as a stationary body and the second housing is used as a rotating body. The fixing remaining portion is held in the stationary housing during an unlocked state. During use of the rotary connector, the fixing remaining portion is prevented from easily coming off the locking portion and generation of noise arising from a held fixing remaining portion is avoided.

What is claimed is:

1. A rotary connector comprising a first and a second housings coupled in a freely rotational relation, a flexible cable for establishing electrical connection between the first and second housings, a lock member which is detachably mounted on the first and second housings and which blocks free rotation between the first and second housings when the lock member is mounted thereon, wherein the first housing has a ring-like outer cylindrical portion and a locking portion provided in the outer cylindrical portion, the second housing has a top surface closing the outer cylindrical portion of the first housing and a rotation restraint portion provided in the top surface, the lock member integrally comprising an arm portion, a finger-hook portion continuously extending to one end of the arm portion and extending in a direction orthogonal to the arm portion, a coupling portion provided in the other end of the arm portion, and a fixing portion extending between the coupling portion and the finger-hook portion in the same direction as that of the finger-hook portion, the fixing portion having a thin portion and a fixing remaining portion continuously extending to the thin portion, wherein, when the first and second housings are in a locked state to block free rotation therebetween, the fixing remaining portion of the lock member is held at the locking portion of the first housing, the coupling portion is engaged with the rotation restraint portion of the second housing, the arm portion is provided along the top surface of the second housing, and the finger-hook portion is protruded outwardly of the outer cylindrical portion of the first housing, and when the first and second housings are put into an unlocked state to permit free rotation therebetween, the finger-hook portion is folded so as to be close to the outer cylindrical portion, thereby separating the arm portion from the thin portion while the fixing remaining portion remains held in the locking portion of the first housing.

2. The rotary connector according to claim 1, wherein the thin portion is formed of a V-shaped notch provided in the fixing portion.

3. The rotary connector according to claim 1, wherein the first housing is a stationary body and the second housing is a rotating body.

4. A rotary connector comprising first and second housings coupled in a freely rotational relation, a flexible cable that establishes electrical connection between the first and second housings, a lock member which is detachably mounted on the first and second housings and which blocks free rotation between the first and second housings when the lock member is mounted thereon, wherein the first housing has a ring-like outer cylindrical portion and a locking portion provided in the outer cylindrical portion, the second housing has a top surface closing the outer cylindrical portion of the first housing and a rotation restraint portion provided in the top surface, the lock member integrally comprises an arm portion, a finger-hook portion continuously extending to one end of the arm portion, a coupling portion provided in the other end of the arm portion, and a fixing portion arranged between the coupling portion and the finger-hook portion, the fixing portion has a thin portion and a fixing remaining portion continuously extending to the thin portion, when the first and second housings are in a locked state to block free rotation therebetween, the fixing remaining portion of the lock member is held at the locking portion of the first housing, the coupling portion is engaged with the rotation restraint portion of the second housing, the arm portion is provided along the top surface of the second housing, and the finger-hook portion is protruded outwardly of the outer cylindrical portion of the first housing, and when the first and second housings are in an unlocked state to permit free rotation therebetween, the finger-hook portion is folded, thereby separating the arm portion from the thin portion while the fixing remaining portion remains held in the locking portion of the first housing.

5. The rotary connector according to claim 4, wherein the thin portion is formed of a V-shaped notch provided in the fixing portion.

6. The rotary connector according to claim 4, wherein the first housing is a stationary body and the second housing is a rotating body.

* * * * *

UNITED STATES PATENT AND TRADEMARK OFFICE
CERTIFICATE OF CORRECTION

PATENT NO.      : 6,475,006 B2
DATED           : November 5, 2002
INVENTOR(S)     : Nobuo Matsuzaki It is certified that error appears in the above-identified patent and that said Letters Patent is hereby corrected as shown below:

Column 7,
Line 60, delete "for establishing" and substitute -- to establish -- in its place.

Column 8,
Line 27, delete "so as to be close to" and substitute -- towards -- in its place.

Signed and Sealed this

Twenty-fifth Day of March, 2003

JAMES E. ROGAN
*Director of the United States Patent and Trademark Office*